United States Patent [19]
Williams et al.

[11] Patent Number: 5,621,588
[45] Date of Patent: Apr. 15, 1997

[54] TWO-PLANE BALANCE FOR HARD DISK DRIVE MOTOR-BASE ASSEMBLIES

[75] Inventors: Kelly Williams, Brentwood; Tho Pham, Milpitas, both of Calif.

[73] Assignee: Samsung Electronics, Inc., Richfield Park, N.J.

[21] Appl. No.: 659,893

[22] Filed: Jun. 7, 1996

[51] Int. Cl.⁶ .............................. G11B 17/02; F16F 15/22
[52] U.S. Cl. .................... 360/98.07; 360/99.08; 74/573 R
[58] Field of Search .............. 360/97.01–97.03, 360/98.01, 98.07, 98.08, 99.04, 99.05, 99.08–99.12; 74/573 R, 574; 29/598, 737, 901, DIG. 28

[56] References Cited

U.S. PATENT DOCUMENTS

| | | | |
|---|---|---|---|
| 4,739,425 | 4/1988 | Dierkes et al. | 360/98.08 |
| 4,784,012 | 11/1988 | Marra | 74/573 R |
| 5,130,870 | 7/1992 | Jabbari | 360/99.08 |
| 5,167,167 | 12/1992 | Tiernan, Jr. et al. | 74/573 R |
| 5,422,776 | 6/1995 | Thorson et al. | 360/98.07 |
| 5,460,017 | 10/1995 | Taylor | 74/573 R |
| 5,537,272 | 7/1996 | Kazmierczak et al. | 360/98.07 |
| 5,555,144 | 9/1996 | Wood et al. | 360/98.08 |

*Primary Examiner*—Jefferson Evans
*Attorney, Agent, or Firm*—Blakely Sokoloff Taylor & Zafman

[57] ABSTRACT

A balanced spin motor assembly of a hard disk drive. The spin motor includes a spindle that is mounted to a base plate of the disk drive by a plurality of mounting screws that are attached to mounting holes of the spindle and base plate. At least one recording disk is attached to a hub assembly that rotates relative to the spindle. The hub assembly contains magnets that are coupled to a coil located within the motor. Energizing the coil with a current creates a torque that rotates the hub and spins the disks. The hub assembly has a plurality of equally spaced threaded apertures located at a top portion and a bottom portion of the hub. The spin motor can be balanced by attaching weight screws to the threaded apertures of the hub. Weight screws can be attached to the bottom portion of the hub through the mounting holes of the base plate and the spindle. Accessing the hub through the mounting holes allows the spin motor to be dynamically balanced while attached to the base plate of the drive.

14 Claims, 1 Drawing Sheet

TWO-PLANE BALANCE FOR HARD DISK DRIVE MOTOR-BASE ASSEMBLIES

BACKGROUND OF THE INVENTION

1. Field of the Invention

The present invention relates to an apparatus and method for balancing a spin motor of a hard disk drive.

2. Description of Related Art

Hard disk drives contain a plurality of magnetic transducers that are coupled to a number of rotating disks. The transducers are typically incorporated into a slider that is supported by an actuator arm. The sliders each have an air bearing surface which creates an air bearing between the transducers and the rotating disks. The air bearings prevent mechanical wear of the transducers. The efficiency of reading and writing information onto the disk is a function of the air bearing height. It is desirable to maintain a constant air bearing height over the entire surface of the disk to prevent head contact and provide a consistent magnetic coupling efficiency.

The disks are typically rotated by a spin motor that is mounted to a base plate of the disk drive. Because of manufacturing tolerances the spin motor may be dynamically imbalanced after initial assembly. Any imbalance may introduce a wobble that will vary the air bearing height of the sliders. Disk drive manufacturers typically test and balance each spin motor at a test station before mounting the motor to the base plate of a drive.

For disk drives that contain multiple disks the spin motor is typically balanced in a first top plane and a second bottom plane. The motor is balanced by adding weights to various portions of the rotating motor hub. The top plane is typically balanced by set screws that are attached to the top of the hub. The bottom plane is typically balanced with a weight that is glued to a groove in the bottom portion of the hub.

Balancing and handling a multiple disk spin motor assembly in a test station separate from the disk drive introduces a process step that may damage the assembly. Additionally, gluing a weight to the hub assembly is undesirable because the adhesive may out-gas and contaminant the disks. The weight may also become detached from the hub and damage the drive. Furthermore, placing the weight in the bottom of the hub limits the diameter and the structural integrity of the motor spindle. It would be desirable to provide a method for balancing a spin motor while the motor is attached to the base plate of the disk drive.

SUMMARY OF THE INVENTION

The present invention is a balanced spin motor assembly of a hard disk drive. The spin motor includes a spindle that is mounted to a base plate of the disk drive by a plurality of mounting screws that are attached to mounting holes of the spindle and base plate. At least one recording disk is attached to a hub assembly that rotates relative to the spindle. The hub assembly contains magnets that are coupled to a coil located within the motor. Energizing the coil with a current creates a torque that rotates the hub and spins the disks. The hub assembly has a plurality of equally spaced threaded apertures located at a top portion and a bottom portion of the hub. The spin motor can be balanced by attaching weight screws to the threaded apertures of the hub. Weight screws can be attached to the bottom portion of the hub through the mounting holes of the base plate and the spindle. Accessing the hub through the mounting holes allows the spin motor to be dynamically balanced while attached to the base plate of the drive.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
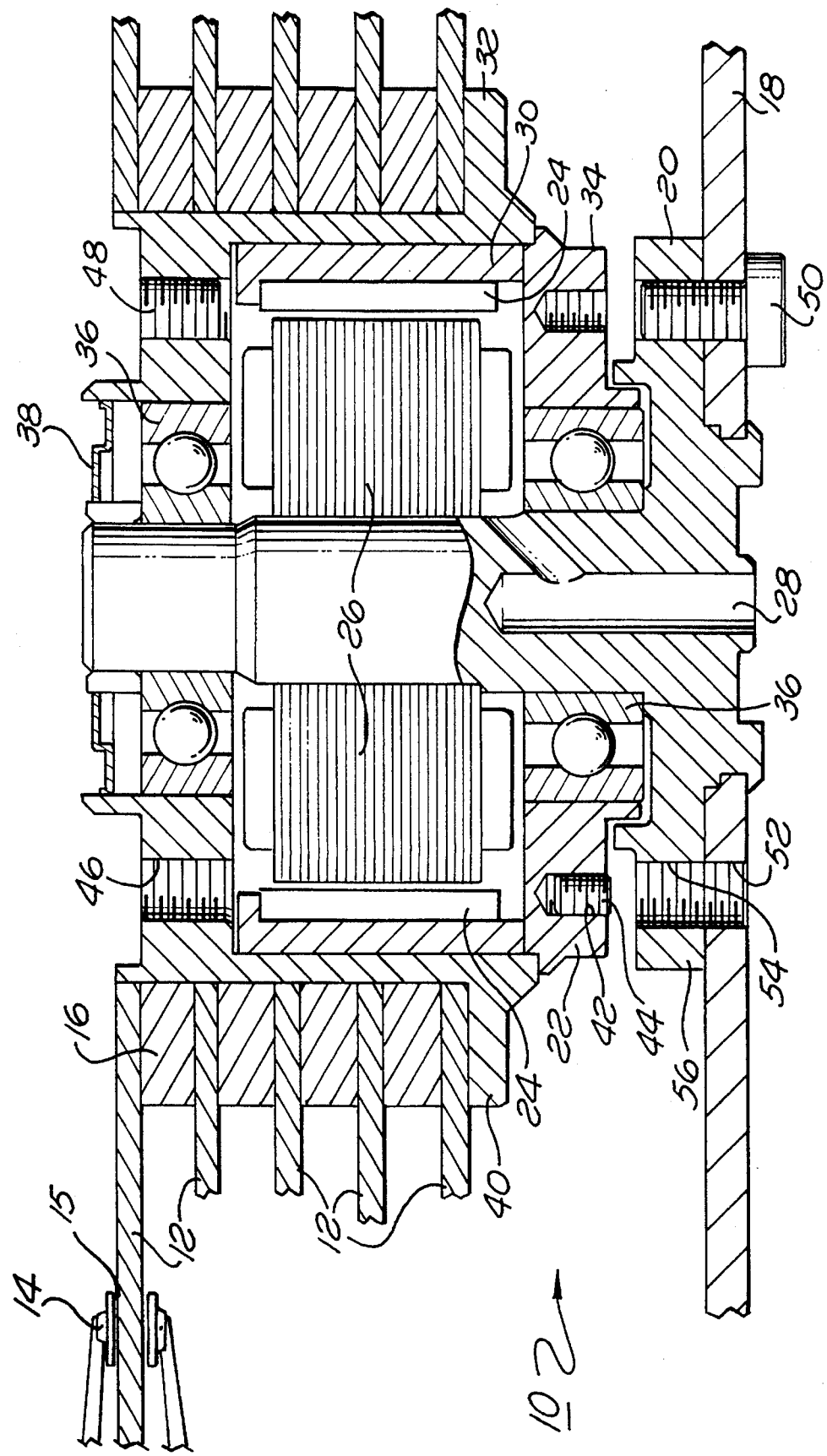
FIG. 1 is a cross-sectional view of a spin motor assembly of the present invention.

Referring to the drawings more particularly by reference numbers, FIG. 1 shows a spin motor assembly 10 of the present invention. The spin motor 10 rotates a plurality of disks 12 relatively to a number of sliders 14 located at each surface of the disks 12. The sliders 14 contain transducers which magnetize and sense the magnetic fields of the disks. The rotation of the disks 12 creates air bearings 15 that separate the sliders 14 from the disk surfaces. The disks 12 are separated by a plurality of spacers 16.

The spin motor 10 is mounted to a base plate 18 of the disk drive. The drive also has a cover plate (not shown) that is attached to the base plate 18 and encloses the disks 12. The present invention allows the spin motor 10 to be dynamically balanced while mounted to the base plate 18 of a disk drive assembly.

The spin motor assembly 10 includes a spindle 20 that is mounted to the base plate 18 of the drive. The motor 10 has a hub assembly 22 which supports the disks 12 and rotates relative to the spindle 20. The hub assembly 22 includes a number of magnets 24 that are coupled to a coil 26 located within the motor 10. The coil 26 has leads that extend through a passage 28 in the spindle 20 and are connected to an external circuit (not shown). The circuit provides a current to the coil 26 to rotate the hub 22, as is known in the art.

The magnets 24 are mounted to a support plate 30 that is attached to an outer hub member 32. The outer hub member 32 is attached to a lower hub member 34. The outer 32 and lower 34 hub members are coupled to the spindle 20 by a pair of bearings 36 which allow the hub assembly 22 and disks 12 to spin about the spindle 20. The spin motor 10 may have lid 38 to seal the bearings 34 and a clamp (not shown) to press the disks 12 onto a lip 40 of the outer hub 32.

The lower hub member 34 has a plurality of equally spaced threaded apertures 42 located at a bottom portion of the hub assembly 22. The apertures 42 can receive one or more first weight screws 44 to balance the bottom plane of the spin motor 10. The outer hub 32 also has a plurality of equally spaced threaded apertures 46 located at a top portion of the hub assembly 22. The apertures 46 of the top portion can receive one or more second weight screws 48 to balance the top plane of the spin motor 10. The screws 44 and 48 have a known weight so that the motor 10 can be readily balanced.

The spin motor 10 is mounted to the base plate 18 by a plurality of mounting screws 50. The mounting screws 50 are screwed into a plurality of equally spaced threaded mounting holes 52 in the base plate 18, and a plurality of corresponding threaded mounting holes 54 located in a base portion 56 of the spindle 20. The minor diameter of the threaded holes 52 and 54 are larger than the outer diameter of the second screws 44 so that the weight screws 44 can be added to the hub 22 through the holes 52 and 54 while the motor 10 is attached to the base plate 18. Attaching the bottom weight screws 44 to the hub 22 through the base plate 18 allows the motor 10 to be balanced while attached to the drive. Balancing the spin motor 10 after the motor 10 is mounted to the base plate reduces the handling and increases the yield of the disk drive. Additionally, the lack of adhesive to mount the weights prevents an out-gas of material which may contaminate the disk 12.

In operation, the spin motor 10 is assembled to the base plate 18 by placing the motor 10 onto the base 18 and screwing the mounting screws 50 into the spindle 20. The disks 12, spacers 16 and clamp are then mounted to the spin motor 10. The drive is then dynamically tested to determine the balance of the spin motor/disk assembly. If the top first plane of the motor is out of balance a top weight screw 48 can be attached to one of the top threaded apertures 46 of the hub 22.

To balance the bottom second plane, one of the mounting screws 50 is removed and the hub 22 is rotated to align one of the bottom threaded apertures 42 with the mounting holes 52 and 54. A weight screw 42 is then attached to the hub 22 through the mounting holes 52 and 54. The mounting screw 50 is then reinstalled into the drive. As an alternate method the spin motor 10 may be mounted and subsequently tested with one of the mounting screws 50 not assembled to the base plate 18 and motor 10, so that a bottom weight screw 44 can be added without requiring the removal of a mounting screw 50.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A disk drive spin motor assembly, comprising:
   a spindle;
   a coil that is coupled to said spindle;
   a hub assembly that rotates relative to said coil and said spindle, said hub assembly having a top portion and a bottom portion;
   a bottom weight screw that is attached to said bottom portion of said hub assembly;
   a base plate provided with at least one aperture aligned to provide access to the bottom weight screw; and,
   a first disk that is attached to said hub assembly.

2. The assembly as recited in claim 1, further comprising a top weight screw that is attached to said top portion of said hub assembly.

3. The assembly as recited in claim 1, further comprising a second disk that is attached to said hub assembly and separated from said first disk by a spacer.

4. The assembly as recited in claim 1, wherein said spindle has an aperture that provides access to said bottom weight screw.

5. The assembly as recited in claim 1, wherein said hub assembly has a plurality of equally spaced threaded apertures that can receive said bottom weight screw.

6. A hard disk drive spin motor assembly, comprising:
   a base plate;
   a spindle that is attached to said base plate;
   a coil that is coupled to said spindle;
   a hub assembly that rotates relative to said coil and said spindle, said hub assembly having a top portion and a bottom portion;
   a bottom weight screw that is attached to said bottom portion of said hub assembly, said base plate having at least one aperture aligned to provide access to said bottom weight screw; and,
   a first disk that is attached to said hub assembly.

7. The assembly as recited in claim 6, further comprising a top weight screw that is attached to said top portion of said hub assembly.

8. The assembly as recited in claim 7, further comprising a second disk that is attached to said hub assembly and separated from said first disk by a spacer.

9. The assembly as recited in claim 8, wherein said spindle and said base plate have a plurality of aligned apertures that provide access to said bottom weight screw.

10. The assembly as recited in claim 9, wherein said hub assembly has a plurality of equally spaced threaded apertures that can receive said bottom weight screw.

11. A method for balancing a spin motor of a hard disk drive, comprising the steps of:
    a) providing a spin motor which has a hub assembly that rotates relative to a coil and a spindle, said hub assembly having a bottom portion that contains an aperture;
    b) attaching said spindle to a base plate which has an aperture that provides access to said aperture of said hub assembly;
    c) dynamically testing said spin motor;
    d) moving said hub assembly so that said aperture of said hub assembly is aligned with said aperture of said base plate; and,
    e) attaching a bottom weight screw to said hub assembly through said aperture of said base plate.

12. The method as recited in claim 11, further comprising the step of attaching a top weight screw to an aperture located in a top portion of said hub assembly.

13. The method as recited in claim 12, said spindle is attached to said base plate with a assembly screw that extends through said aperture of said base plate.

14. The method as recited in claim 13, further comprising the step of removing said assembly screw to provide access to said aperture of said hub assembly.

* * * * *